United States Patent

[11] 3,581,190

[72] Inventor Ian McLaren Brown
 St. Louis, Mo.
[21] Appl. No. 760,234
[22] Filed Sept. 17, 1968
[45] Patented May 25, 1971
[73] Assignee McDonnell Douglas Corporation
 St. Louis, Mo.

[54] MICROWAVE RESONANCE SYSTEMS
 EMPLOYING A BIMODAL CAVITY
 20 Claims, 8 Drawing Figs.
[52] U.S. Cl. ..................................... 324/0.5,
 324/58.5, 330/4
[51] Int. Cl. ..................................... G01n 27/78
[50] Field of Search ........................ 324/0.5, 58,
 58.5; 331/3, 94; 330/4; 333/73 W, 83

[56] References Cited
 UNITED STATES PATENTS
3,013,217 12/1961 Lewin ........................... 330/4
3,243,700 3/1966 McAuoy ........................ 324/0.5
3,323,044 5/1967 Parlanti ........................ 324/58.5

Primary Examiner—Michael J. Lynch
Attorney—Charles B. Haverstock

ABSTRACT: A bimodal microwave cavity structure having separate communicating cavity portions, one of which includes means for positioning a sample or specimen, said cavity structure being able to be resonant in more than one mode such that the sample or specimen when positioned at a suitable location in one of the structure cavities can interact with the fields associated with all modes that are present. The present structure is a relatively simple inexpensive device which can be used to gather information and particularly information from which relatively complex characteristics of specimen substances can be determined. The present structure can also be used in the construction of two level maser devices as well as in other devices.

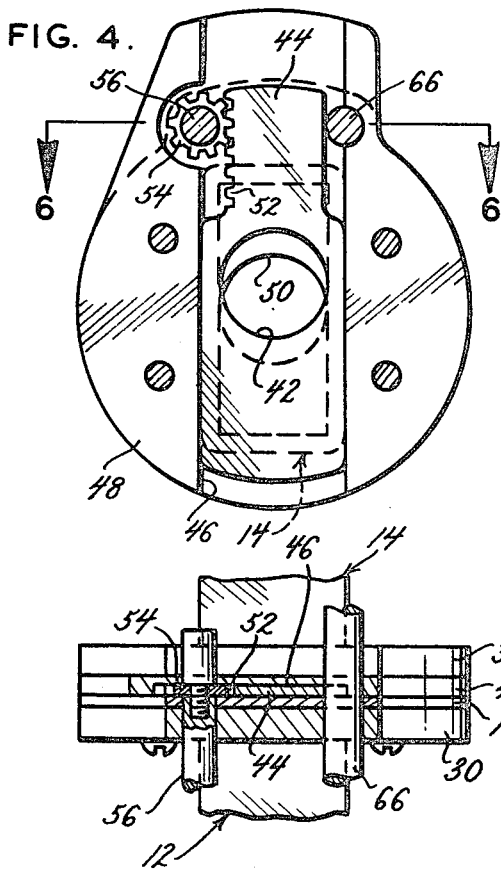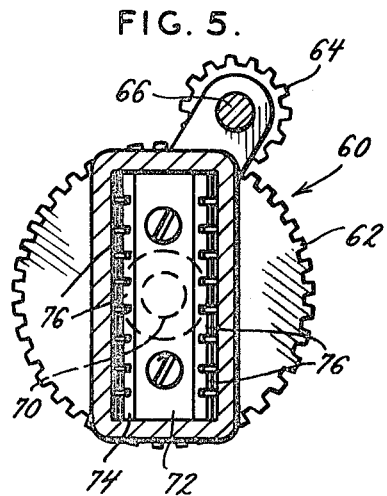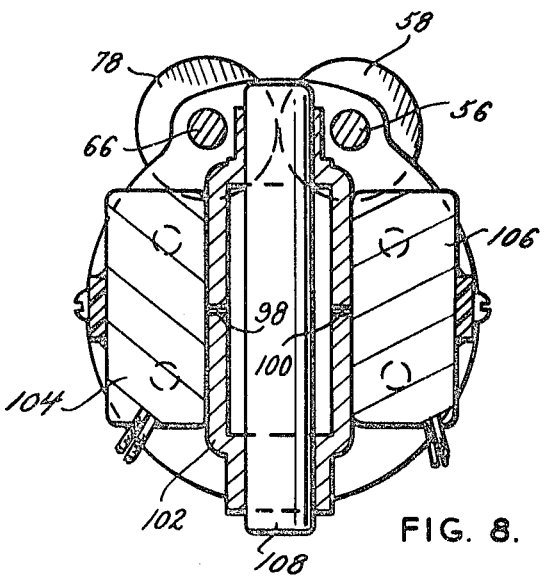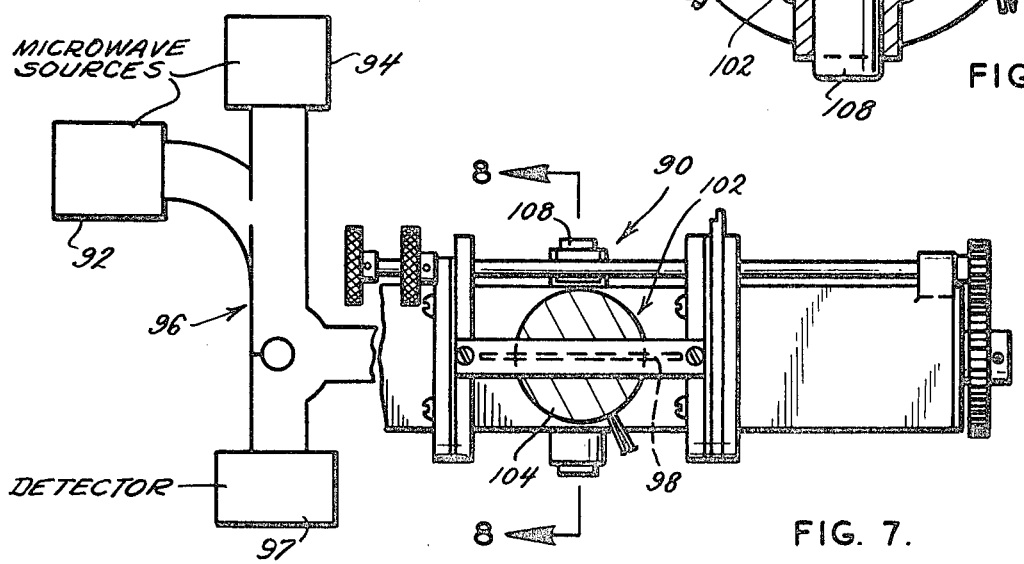

MICROWAVE RESONANCE SYSTEMS EMPLOYING A BIMODAL CAVITY

The present invention relates generally to microwave cavity structures and more particularly to a dual-moded cavity structure capable of operating simultaneously in two microwave frequency modes.

There is a continuing and increasing need for accurate means for measuring or gathering data from which to ascertain or calculate certain relatively complex characteristics and properties of substances including characteristics and properties which can be determined only from data obtained when the substance or substances are exposed to or stimulated by microwave energy. There is also a need for means that are able to sense changes that occur in the substances being stimulated as a result thereof. To this end there is a growing need for a resonant cavity structure capable of being simultaneously resonant at more than one mode and capable of operating as a two level maser or other dual-moded device.

The present invention teaches the construction and operation of a novel dual-moded cavity structure having two separate but coupled cavity portions. The present multicavity structure also provides relatively simple means for stimulating samples by exposing them to more than one operating mode in order to obtain data from which to determine information about the sample such as its spin diffusion rates, ascertaining if one or more than one species of the sample substance is giving rise to a complicated electron spin resonance spectrum, distinguishing between different types of paramagnetic substances or species including distinguishing between biradical and monoradical substances, providing means for producing a two level maser and so forth. The present structure also has many other uses and applications and it operates differently from any known cavity structure. Furthermore, so far as known, there has not heretofore been developed a dual-moded cavity structure capable of accomplishing these and other things in the same or similar manner and with the same degree of accuracy, flexibility, and utility and there has not heretofore been a dual cavity structure wherein a specimen positioned in one cavity can be exposed to microwave energy in more than one mode.

Various means and methods including various forms of microwave resonant devices and structures have been devised heretofore in an effort to obtain information from which to determine some of the above characteristics and properties of substances. The prior art, for example, discloses various dual and multiple cavity devices including some in which the relative number of electron spins in a series of unknowns as well as other information about an unknown sample can be determined. In the known prior art devices, however, a calibrated standard having certain known characteristics is usually employed simultaneously with one or more samples of some unknown substance and all of the samples including the standard are placed in the same cavity and subjected to different microwave frequencies and/or the same or different field modulation. Information as to resonance is then produced and detected by detector means which are coupled to the cavity, and means are provided to separate the output components associated with each of the different samples so that the different outputs can be read or recorded for comparison with the outputs produced by the standard.

The present device, on the other hand, being a dual cavity, dual-moded structure does not require separate input and output means including separate means associated with each specimen or standard, and it does not require that a comparison be made between data obtained about an unknown specimen and data known or obtained as to the standard. The present device instead requires but one sample and no standard, and yet because of the way the sample is stimulated and the way the cavity is constructed and adjusted a great amount of information can be obtained some of which is difficult if not impossible to obtain in any other known way. The present device also represents an important advance over known devices which employ cavity structures and other accessory means which complicate them structurally and operationally and add substantially to their cost. The several different forms of tuning means provided in the present device also increase its accuracy and versatility and provide means by which resonance can be obtained in more than one mode and by which a frequency separation can be established between the several different resonant modes.

It is therefore a principal object of the present invention to provide an improved bimodal cavity structure having wide usage and application and capable of operating at any frequency or frequencies with a relatively broad frequency spectrum.

Another object is to provide a cavity structure capable of simultaneous resonances at two modes, said cavity being constructed so that a specimen can be positioned therein at a location to interact with fields associated with both resonant modes.

Another object is to provide a bimodal cavity structure capable of providing almost any frequency separation between modes of different resonant frequencies that may be present.

Another object is to provide a relatively simple and inexpensive instrument for examining and analyzing substances and one which can be operated at any temperature within a broad temperature range extending from a few hundred degrees centigrade and even higher to the temperature of liquid helium and lower.

Another object is to provide a microwave cavity structure constructed so that microwave energy can be pumped into a paramagnetic specimen at one frequency and the magnetic effects thereof on the specimen can be monitored at a different frequency.

Another object is to provide relatively simple tuning means for a dual-moded cavity structure.

Another object is to provide a dual-moded, dual cavity structure into which two or more microwave inputs can be fed at a common input.

Another object is to provide improved means for analyzing substances using microwave energy.

Another object is to provide a dual cavity structure wherein a specimen positioned in one cavity thereof can be exposed simultaneously to microwave energy at more than one mode.

Another object is to provide improved means for producing a desired frequency separation to split the modes established in the cavities of a dual cavity structure.

Another object is to simplify the input and output coupling means for a dual-moded, dual cavity structure.

These and other objects and advantages of the present invention will become apparent after considering the following detailed specification which discloses a preferred embodiment of the subject device in conjunction with the accompanying drawings, wherein.

Figure 1:
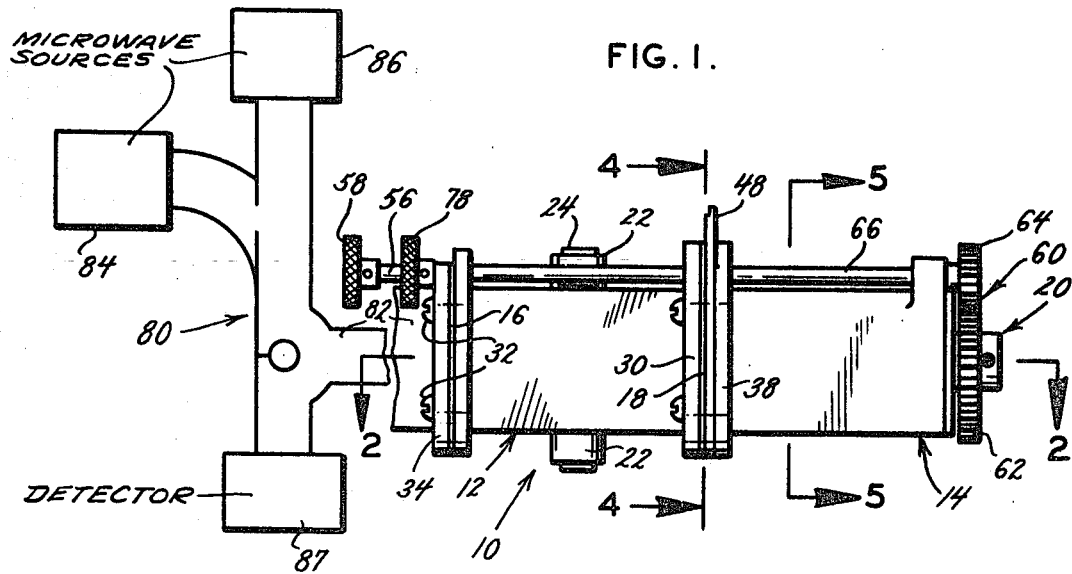
FIG. 1 is an elevational view of a dual-moded, dual cavity structure constructed according to the present invention in conjunction with a typical system installation shown schematically.
Figure 2:
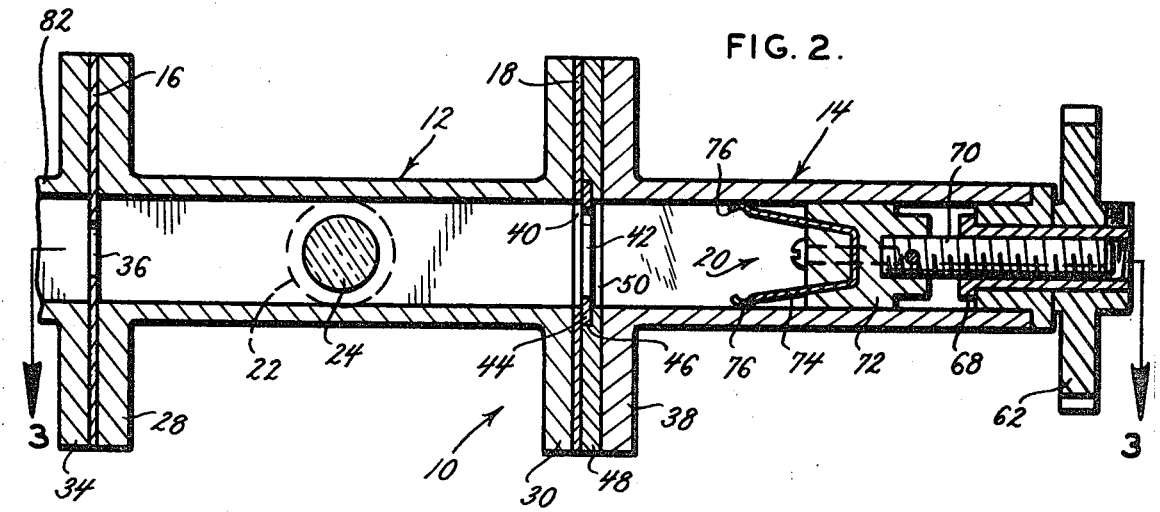
FIG. 2 is a cross-sectional view taken on line 2–2 of FIG. 1.

FIGS. 4 and 5 are sectional views taken respectively on lines 4–4 and 5–5 of FIG. 1;

FIG. 6 is a sectional view taken on line 6–6 of FIG. 4;

FIG. 7 is a view similar to FIG. 1 but showing the subject device as modified for use as a two level maser or other similar application; and, FIG. 8 is a cross-sectional view taken on line 8–8 of FIG. 7.

Referring to the drawings more particularly by reference numbers, number 10 refers generally to a dual-moded, dual cavity structure constructed according to the present invention. The structure 10 includes a first cavity portion 12, a second cavity portion 14, an input iris wall member 16 for coupling the input of the structure 10 to a source of microwave energy, a second iris or wall member 18 positioned between and coupling the cavity portions 12 and 14, and a tuning assembly 20 associated with the second cavity portion 14.

Figure 3:
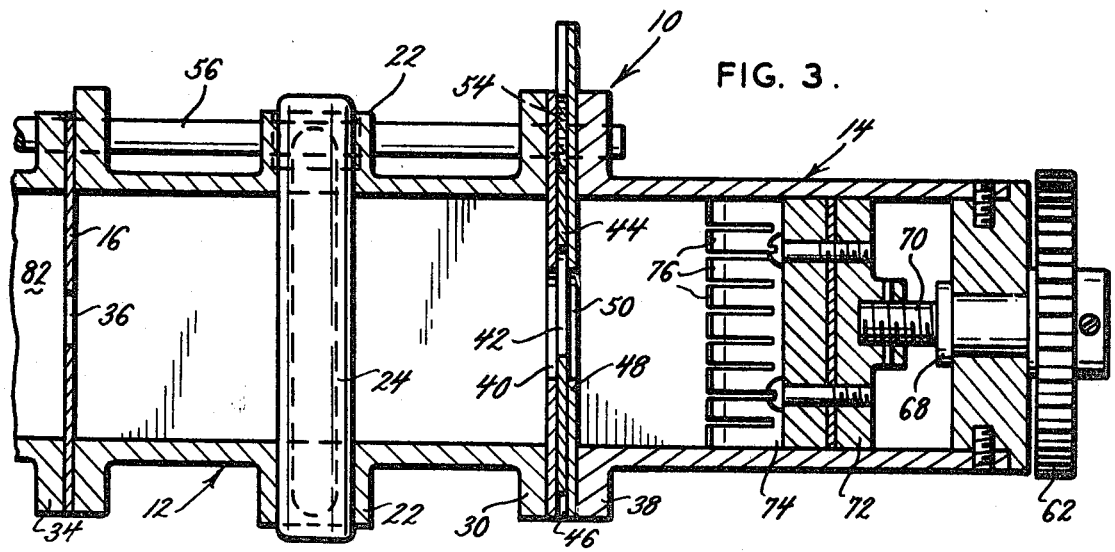
FIG. 3 is a cross-sectional view taken on line 3–3 of FIG. 2.

The first cavity portion 12 has a transverse portion 22 formed by two similar aligned tubular portions which extend from opposite sides thereof as shown. The portion 22 is constructed to locate and support a sample or specimen 24 of a substance to be analyzed. In the particular form of the invention shown in FIG. 3 the sample or specimen is illustrated as including a dielectric tube such as quartz tube 24 which contains a specimen substance to be examined. The specimen substance can be in solid, liquid or plasma form and can be sealed inside the tube 24. The tube 24 can also be substituted for by a rod or bar of a suitable dielectric material with particles or pieces of a substance positioned or embedded in it. The dielectric tube 24 may also be constructed to be open ended and to be connected into a suitable system containing a substance to be analyzed which substance can flow or move through the tube during analysis. Many different kinds of specimens can be analyzed using the subject dual-moded cavity structure and it is not intended to limit the invention to use with a particular specimen or a particular means for containing the specimen.

The first cavity portion 12 is shown as including a pair of spaced circular end flanges 28 and 30, each of which has a plurality of mounting holes which are provided to receive suitable fasteners 32 for connecting the adjacent components of the structure together. This includes connecting together the members 12 and 16 as well as an input-output waveguide structure flange 34 which feeds the cavities and also has the output produced therein. The iris 16 is shown as a circular disc member having a central coupling aperture 36 provided to couple the cavity structure 10 to an input waveguide structure which will be described later.

The second iris member 18 is positioned between the flange 30 at one end of the cavity portion 12 and a similar flange 38 located on the adjacent end of the second cavity portion 14. The iris member 18, like the iris 16, has four holes which register with similar holes on the flanges 30 and 38 to accommodate fasteners for connecting said members together. The iris member 18 also has a central aperture 40 which registers to an adjustable extent with an aperture 42 in an adjustable slide member 44. The slide member 44 is movable in a transverse groove 46 formed in a fixed member 48 which is positioned adjacent to the fixed iris member 18. The member 48 also has another fixed aperture 50 therethrough which is of the same or similar size as the aperture 40 in the member 18. The slide member 44 also has rack gear teeth 52 formed along one edge thereof which cooperatively engage teeth on a rotatable gear member 54 (FIG. 4) which is mounted on a shaft 56 that extends lengthwise along the subject structure. The shaft 56 is journaled to the structure by suitable means to enable it and the gear 54 to be rotated. Rotation of the shaft 56 is accomplished manually by rotating a knob 58 at one end thereof and when so rotated adjusts the position of the slide member 44. In this way the position of the aperture 42 in the slide member 44 can be changed relative to the positions of the fixed apertures 40 and 50 in the members 18 and 48. This is done to split the operating modes existing in the separate cavities as will be explained later.

The opposite end of the second cavity portion 14 from the flange 38 is open ended to receive the movable tuning assembly 20. The position of the tuning assembly 20 in the cavity portion 14 is adjustable by means of another gear assembly 60 which includes a first gear member 62 which engages a smaller gear 64 mounted on one end of another rotatable shaft 66. The shaft 66 is journaled to and extends along the side of the structure 10 as shown in FIGS. 1 and 8. When the shaft 66 is rotated it rotates the gear 64 and this in turn rotates the larger gear 62 and a threaded member 68 which is attached thereto. The threaded member 68 in turn cooperates with a nonrotatable threaded member 70 attached to a movable block member 72 which is part of the tuning assembly 20. The block 72 has substantially the same cross-sectional shape as the inside of the second cavity portion 14 and during adjustment moves in the cavity to change the interior size of the cavity portion 14. In this way the cavity portion 14 is tuned. The block member 72 also has a springlike member 74 attached to the side thereof opposite from the threaded rod 70, and the teeth portions 76 (FIG. 3) of the member 74 engage opposite inner surfaces of the cavity 14 to establish good electrical contact between the block 72 and the cavity structure, and to stabilize the block member and prevent movement thereof due to looseness and vibration. The opposite end of the rotatable tuning shaft 66 from the gear 64 is provided with a suitable tuning knob 78 to facilitate rotating the shaft 66.

The resonant frequency of the cavity portion 12 is fixed by the physical characteristics and size of the structure itself and is not adjustable or tunable as is the cavity portion 14. The coupling between the two cavity portions 12 and 14, however, as well as the tuning of the cavity portion 14 is adjustable by adjusting the position of the slide member 44 as aforesaid.

The input and output means for the subject structure 10 are both coupled to the same end of the structure which in the drawings is the end associated with the coupling iris member 16. The input and output means may include a waveguide assembly 80 having one portion 82 attached to the structure 10 adjacent to and in communication with the iris opening 36 in the iris 16. The input-output waveguide assembly 80 also includes means coupling it to several sources of microwave energy such as to klystrons 84 and 86 capable of producing microwave energy at more than one frequency for introducing into the subject structure. By properly adjusting the tuning means 20 in the second cavity portion 14 and by properly constructing the cavity portion 12 the cavities 12 and 14 can be made to simultaneously resonate at two different microwave frequencies, each being determined by its own physical characteristics.

A sample or specimen to be analyzed such as a paramagnetic sample placed in the portion 22 of the cavity portion 12 and extending thereacross will interact with the fields associated with both microwave modes that may be present. The frequencies of the two different modes in turn depend in part on the magnitudes and frequencies of the two inputs and also on the coupling between the two cavity portions provided by the adjustable coupling means included on the fixed iris 18 as well as on the position of the adjustable slide member 44. In the usual case the two cavity portions are adjusted initially to resonate at the same microwave frequency and a frequency separation and associated splitting of the modes obtained by adjusting the slide member 44. With the present construction any frequency separation within a range from a few megaHertz or even higher up to about 500 megaHertz is obtainable. It can therefore be seen that with the present construction only one input connection is required to couple two input sources such as two klystron sources to a dual-moded, dual cavity structure, and the same point of input can also be used as the point where the output is available and detected by detector means 87 as will be explained. The construction of the present device also enables it to be reliably and accurately operated at any temperature within a relatively wide range extending from a high to a few hundred degrees centigrade and higher down to the temperature of liquid helium and even lower. This is a distinct advantage and one which substantially extends the usefulness of the present device.

Another advantage obtainable by the subject structure is that microwave energy can be pumped into a sample specimen such as the paramagnetic sample 24 at one input frequency and the magnetic effects on the sample can be monitored at another frequency which may be the other operating or input frequency. This capability gives the present device important advantages and uses especially when operating as an instrument for measuring or determining certain characteristics and properties of the sample. For example, the present device can be used to measure the spin diffusion rates of the sample, it can be used to ascertain if more than one species is giving rise to a certain electron spin resonance spectrum, it can be used to distinguish between different types of paramagnetic species such as between biradical and monoradical species which are characterized by their electron coupling, and it can be used as a two level maser with the pump input operating at the frequency of one of the modes and the amplifying means including the output at the frequency of the other mode.

Although the drawings show the subject device as including a structure having rectangular cavities, in principle any combination of cylindrical, rectangular or even dielectric cavities including dielectric cavity structures such as one disclosed in copending Rosenbaum application Ser. No. 367,929, filed May 18, 1964, now U.S. Pat. No. 3,448,379, and assigned to Applicant's assignee can be used.

The subject dual cavity structure is a much simpler device structurally than any known device used for the same or similar purposes in electron paramagnetic resonance spectrometry systems and the like, and has certain advantages over known structures used for this and other purposes including in addition to its simpler structure its simple cavity coupling adjustment means, its relatively simple tuning means, its improved frequency characteristics, and its ability to operate at almost any temperature. The reduced input and output coupling means is also an advantage as is the fact that the structure of the subject cavity does not need to be altered in any way.

The fact that the subject device 10 has the property of being able to resonate at two different frequencies or modes is important to the operation because it means that the specimen, which may be of a paramagnetic substance, if properly located as shown, will interact with the fields associated with the frequencies of both modes that are present. The frequencies of the two modes as aforesaid depend on the resonant frequencies of the two cavity portions 12 and 14 and also on their magnitudes and the coupling provided between the cavity portions by the coupling provided therebetween. It is also to be noted that changes in the resonant frequency of the cavity portion 14 can be accomplished in one or both of two ways, either by adjusting the tuning means 20 as explained above or by adjusting the position of the slide member 44 to vary the coupling between the cavity portions. One or both of these adjustment features can also be used to produce the desired frequency separation between the resonant frequencies of the cavity portions 12 and 14 and to split the modes. Also with the present device in a system as disclosed it is possible to pump microwave energy into a paramagnetic sample at one frequency and monitor the magnetic effects thereof at the other input frequency. This is an important departure from known devices.

FIGS. 7 and 8 show a modified form 90 of the subject cavity structure. The modified form 90 includes two klystron cavity resonator devices 92 and 94 coupled to supply microwave energy at two distinct frequencies through waveguide means 96 to the input of the structure 90 in a manner similar to that described above. Waveguide means 96 also connect detector means 97 to the output of structure 90. The main difference between the structure 90 and the structure 10 is that the structure 90 has means forming slots 98 and 100 in opposite sides of the cavity portion 102 to introduce and establish a magnetic field therein, the magnetic field being established by electromagnetic means 104 and 106 positioned and attached to the structure as shown. This is an important optional additional feature which extends the usefulness of the present device by enabling the specimen 108 to be subjected to this additional type of stimulation.

The subject device can also be constructed to be operated as a two level maser. The structure of such a device including its input, output, tuning and adjusting features may all be similar to those of the devices shown in the drawings. In addition, however, the specimen will be a crystal member such as a ruby rod instead of some other type of specimen. In the maser application the microwave energy from one of the input klystrons produces a resonant condition at a first frequency in one of the cavities, and the microwave energy from the other klystron which is usually of considerably less magnitude produces the second different resonant condition in the other cavity. The ruby member interacts with both resonant conditions simultaneously and in so doing produces the necessary changes in the population distribution between the different energy levels that exist in the ruby as a result of the stimulations. In this way, energy levels are established in the ruby and the electrons that exist at the various levels including the lower level will be stimulated by the microwave inputs to undergo transitions to higher energy levels and under suitable conditions a population inversion will be established for producing a maser output. Under this inverted condition, the introduction of the second signal input will cause electrons in the higher energy levels to undergo transitions to the lower energy levels thereby emitting energy at the desired signal frequency which can be sensed and taken out at the same place as the inputs are introduced. Hence it can be seen that with slight modification of the inputs and with a suitable specimen such as a ruby rod the subject device can be converted into a maser. In the maser application the electron transitions that occur from a low energy level to a higher energy level result in energy absorption while the electron transitions which occur from a high energy level to a lower energy level result in energy emission. This is a well-known phenomenon. For useful energy to be produced by a maser it is usually necessary to establish a population inversion condition as aforesaid with accompanying emission.

Although two-cavity resonators have been used in maser applications to achieve broad band amplification heretofore, all such devices so far as known have required that a sample of the maser material be placed in each of the cavities. The present cavity structure, on the other hand, has two cavities and operates in two resonant modes and yet is so constructed that a sample placed in one cavity will interact with the magnetic fields associated with both cavity modes. This is a new concept in maser construction and operation. In a typical application using the present device, low level klystron power is coupled into one resonant mode while pulsed power from another klystron is coupled into the other mode. In this way, microwave energy is pumped into one spin packet of an inhomogeneous electron paramagnetic resonant (EPR) line and the effect on the magnetization is observed at another spin packet site within the line. The time dependence of the monitored reflected power from the cavity will then contain information about the spectral diffusion rates within the inhomogeneous line. Also the subject two cavity resonator as shown includes a fixed or nonvariable cavity which operates as a fixed frequency rectangular $TE_{012}$ cavity and is cascaded through the variable coupling aperture to the second variable or tunable cavity which is a $TE_{011}$ cavity, and the sample which is a paramagnetic sample is shown located at the center of the fixed cavity with its axis parallel to the wider sidewalls of the cavity.

In using the present bimodal cavity structure in certain applications such as electron paramagnetic resonance applications it is usually also desirable to have large sample filling factors from both modes. For relative low frequency separations between the separate cavity portions the value of the filling factor will depend upon the maximum value of the coupling therebetween. This condition can be obtained in an actual device by initially setting both cavities to the same frequency and adjusting the variable coupling iris therebetween to produce the required frequency separation of splitting. Using this technique it is found that one resonance condition remains relatively fixed while the other changes over a relatively broad range as the member 44 is moved from a condition wherein the holes 40 and 42 are aligned to a condition where they are substantially out of alignment reducing the coupling between the cavity portions.

To obtain a greater frequency separation between the modes in the different cavity portions the cavities must usually be tuned so that their frequencies are initially different. In this case, the sample filling factor of the mode associated with the fixed frequency increases as the frequency separation increases and approaches the value of the filling factor for an unperturbed $TE_{012}$ mode. In this case, the filling factor of the mode associated with the tunable cavity decreases with increasing frequency separation. It can therefore be seen that for some uses, both of the tuning means including the cavity tuning means and the coupling means must be adjusted to produce the desired condition and in other cases, particularly cases which require relatively little frequency separation between the modes, only the adjustable coupling iris need be adjusted. It can be shown that the sample filling factor of the mode associated with the fixed frequency cavity increases and approaches the value of the filling factor for the unperturbed $TE_{012}$ mode. At the same time the filling factor of the tunable cavity decreases with increased frequency separation. These and other characteristics of the present structure can be supported by mathematical equations most of which are found in the literature.

Thus there has been shown and described a novel multimode cavity structure which fulfills all of the objects and advantages sought therefor. Many changes, modifications, alterations, and other uses and applications of the subject device will, however, become apparent to those skilled in the art after considering this specification and the accompanying drawings. All such changes, modifications, alterations, and other uses and applications which do not depart from the spirit and scope of the invention are deemed to be covered by the invention which is limited only by the claims which follow.

What I claim is:

1. A resonant cavity structure comprising a housing having first and second cavities formed therein, means coupling the first and second cavities including a wall member having an orifice therethrough and means for varying the physical characteristics of the orifice to vary the coupling between the first and second cavities, a source of microwave energy and means coupling said source to said first cavity to establish microwave components in said first and second cavities that are capable of being resonant at more than one frequency, means for tuning one of said cavities to adjust its resonant frequency, the resonant frequency of the other cavity being determined by the physical characteristics thereof, said tuning means including means to simultaneously adjust the frequency separation between the resonant frequencies of said first and second cavities, and means associated with one of said cavities for positioning a specimen sample therein in position to be exposed to and to interact with the microwave energy at the several resonant frequencies present in said cavities.

2. The structure defined in claim 1 wherein the specimen sample includes a dielectric member extending across said one cavity, said dielectric member having a specimen substance positioned therein.

3. The structure defined in claim 1 wherein said tuning means include a member movable in said one cavity, and means for moving said member to change the physical characteristics of said one cavity.

4. The structure defined in claim 1 wherein said sample includes a crystal member.

5. The structure defined in claim 1 wherein said sample includes a ruby member.

6. The structure defined in claim 1 wherein the means coupling said one cavity to the source of microwave energy include an iris member.

7. The structure defined in claim 1 wherein the means for varying the physical characteristics of the orifice include means for adjusting the size of said orifice.

8. A resonant cavity structure comprising a housing having first and second cavities therein, means coupling the first and second cavities including wall means between said cavities and a coupling aperture in said wall means, means for varying the physical characteristics of the coupling aperture to vary the coupling provided by said aperture, a source of microwave energy capable of producing microwave components resonant at more than one frequency mode, means coupling said source to said housing to introduce microwave energy into the first and second cavities, adjustment means associated with one of said cavities to change the physical characteristics and the resonant frequency mode that said one cavity can support, the resonant frequency mode of the other cavity being determined by its physical characteristics, other means adjustable to produce a desired frequency separation between and resonant frequencies of said first and second cavities, a specimen substance capable of interacting with microwave energy positioned in one of said cavities at a location therein such that it will simultaneously interact with microwave energy at the resonant frequency modes of both said first and second cavities, and means for detecting changes in the magnetic susceptibility of the specimen substance for different frequency separations between the resonant frequency modes present in said cavity structure, said detection means including means for coupling said detection means to the housing at the same location thereon as the said microwave source is coupled.

9. The resonant cavity structure defined in claim 8 including means for establishing a magnetic field in one of said cavities, said means for establishing a magnetic field including means for modulating the magnetic field.

10. The resonant cavity structure defined in claim 9 wherein said means for establishing a magnetic field include spaced magnetic members positioned adjacent to opposite sides of the said one cavity, and means forming openings in the housing adjacent to said one cavity to communicate said one cavity with the magnetic means.

11. A maser device comprising a cavity structure having first and second cavities therein, means coupling said first cavity to said second cavity, means including a source of microwave energy and means coupling said source to one of said cavities to introduce microwave energy thereinto, the coupling means between said first and second cavities permitting some microwave energy from said source to be present in both of said first and second cavities, means for tuning one of said cavities to change the resonant frequency mode thereof, the resonant frequency mode of the other cavity being fixed and determined by the physical characteristics thereof, a crystal member positioned in one of said cavities at a location to interact with microwave energy at the resonant frequency modes of said first and second cavities, means for adjusting the coupling means between said first and second cavities to produce a frequency separation between the resonant frequency modes of said cavities and an energy inversion in the crystal member, and means for detecting energy emitted by said crystal member.

12. The maser device defined in claim 11 wherein said source of microwave energy includes first resonator means capable of producing microwave energy at a first frequency, and second resonator means capable of producing microwave energy of lesser magnitude and at a different frequency.

13. A resonant cavity structure comprising means having connected first and second cavities therein, means coupling said first and second cavities including adjustment means for varying the coupling therebetween, the physical characteristics of one of said cavities being fixed so that said one cavity is resonant at a predetermined resonant frequency mode, means for adjusting the physical characteristics of the other cavity to change the resonant frequency thereof, a source of microwave energy including means coupling said source to said cavity structure to establish distinct microwave energy modes in said first and second cavities, adjustment means for producing a predetermined frequency separation between the microwave energy modes present in said first and second cavities, said coupling means establishing communication between the first and second cavities to enable some energy at both modes to be present in both said first and said second cavities, a specimen sample positioned in one of said cavities in position to interact with the microwave energy at both modes, and means for detecting changes that occur in the specimen sample for different conditions of the cavity coupling adjustment means and for different resonant frequency mode separations between the cavities, said detection means including means for coupling said detection means to one of said cavities.

14. The resonant cavity structure defined in claim 13 wherein said detection means are coupled to the cavity structure at the same location as the microwave energy source.

15. The resonant cavity structure defined in claim 13 wherein said source of microwave energy is resonant at a first frequency and said detector means are adjusted to be resonant at a different frequency depending upon the frequency separation of the modes at which said first and second cavities resonate.

16. The resonant cavity structure defined in claim 13 including means establishing a magnetic field in one of said cavities.

17. A dual cavity structure comprising a housing having first and second cavities formed therein, a source of microwave energy, means coupling said source to one of said cavities to introduce microwave energy therein, one of said cavities having a fixed nonadjustable construction to be resonant at a first frequency mode, means for adjusting the physical size of the other cavity to change its resonant frequency mode, a member having an aperture therethrough positioned between and coupling the said cavities, means for adjusting the size of the aperture coupling the cavities to produce a frequency split between the modes established in said cavities, some of the energy of both modes being present in both said first and second cavities, and a paramagnetic specimen positioned in one of said cavities at a location to interact with the microwave energy modes associated with both of said cavities, the frequencies of said cavity modes being dependent on the resonant frequencies of the respective cavities and the magnitude of the coupling provided therebetween.

18. The dual cavity structure defined in claim 17 wherein said source of microwave energy includes a pair of cavity resonators, and said means coupling said source to one of the cavities include waveguide means and input coupling means coupling said waveguide means to said one cavity.

19. The dual cavity structure defined in claim 17 including detector means coupled to said one cavity.

20. The dual cavity structure defined in claim 17 wherein microwave energy from said source is pumped into the paramagnetic specimen at one frequency and means for monitoring the magnetic effects thereof at a different frequency.